US010845210B2

(12) United States Patent
Reidl et al.

(10) Patent No.: US 10,845,210 B2
(45) Date of Patent: Nov. 24, 2020

(54) SENSOR WITH INTERFACE FOR FUNCTIONAL SAFETY

(71) Applicant: Infineon Technologies AG, Neubiberg (DE)

(72) Inventors: Christian Reidl, Villach (AT);
Wolfgang Granig, Seeboden (AT);
Harald Witschnig, Landskron (AT);
Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 378 days.

(21) Appl. No.: 15/851,919

(22) Filed: Dec. 22, 2017

(65) Prior Publication Data

US 2018/0188071 A1 Jul. 5, 2018

Related U.S. Application Data

(63) Continuation of application No. 14/316,208, filed on Jun. 26, 2014, now Pat. No. 9,863,786.

(60) Provisional application No. 61/847,097, filed on Jul. 17, 2013.

(51) Int. Cl.
*G01D 1/16* (2006.01)
*G01D 3/024* (2006.01)
*G01D 21/00* (2006.01)

(52) U.S. Cl.
CPC .............. *G01D 1/16* (2013.01); *G01D 3/024* (2013.01); *G01D 21/00* (2013.01)

(58) Field of Classification Search
CPC .......... G01D 1/16; G01D 21/00; G01D 3/024
See application file for complete search history.

(56) References Cited

U.S. PATENT DOCUMENTS

| | | | |
|---|---|---|---|
| 4,340,881 | A | 7/1982 | Stack |
| 7,092,848 | B2 | 8/2006 | Hoff et al. |
| 7,498,930 | B2 | 3/2009 | Phillips et al. |
| 8,055,814 | B2 | 11/2011 | Sichner et al. |
| 8,131,507 | B2 | 3/2012 | Uemura |
| 8,417,856 | B1 | 4/2013 | Reich et al. |
| 9,148,709 | B2 | 9/2015 | Hammerschmidt |
| 9,863,786 | B2 | 1/2018 | Reidl et al. |
| 2009/0021414 | A1 | 1/2009 | Breton et al. |
| 2010/0225257 | A1 | 9/2010 | Masfaraud et al. |
| 2010/0245057 | A1 | 9/2010 | Chamarti et al. |

(Continued)

FOREIGN PATENT DOCUMENTS

| | | |
|---|---|---|
| DE | 19508303 A1 | 9/1996 |
| WO | WO 2012038169 | 3/2012 |

OTHER PUBLICATIONS

Witschnig H., et al., "A Fully Monolithic Integrated Anisotropic Magneto Resistance Based Angle Sensor for Automotive," IEEE, Transducers 2013, Barcelona, Spain, Jun. 16-20, 2013, pp. 2257-2260.

*Primary Examiner* — Mischita L Henson
(74) *Attorney, Agent, or Firm* — Harrity & Harrity, LLP

(57) ABSTRACT

A sensor interface operates to communicate a sensed quantity along one or more processing pathways and in different data representations. The signal representations can be swapped along one or more locations of the signal processing branches. These branches are independent from one another and combined at an interface component for transmission along a single path or node for a control unit.

20 Claims, 12 Drawing Sheets

(56) References Cited

U.S. PATENT DOCUMENTS

2012/0074972 A1  3/2012  Rasbornig et al.
2014/0358377 A1* 12/2014  Hammerschmidt .... G06F 11/36
                                                    701/45

* cited by examiner

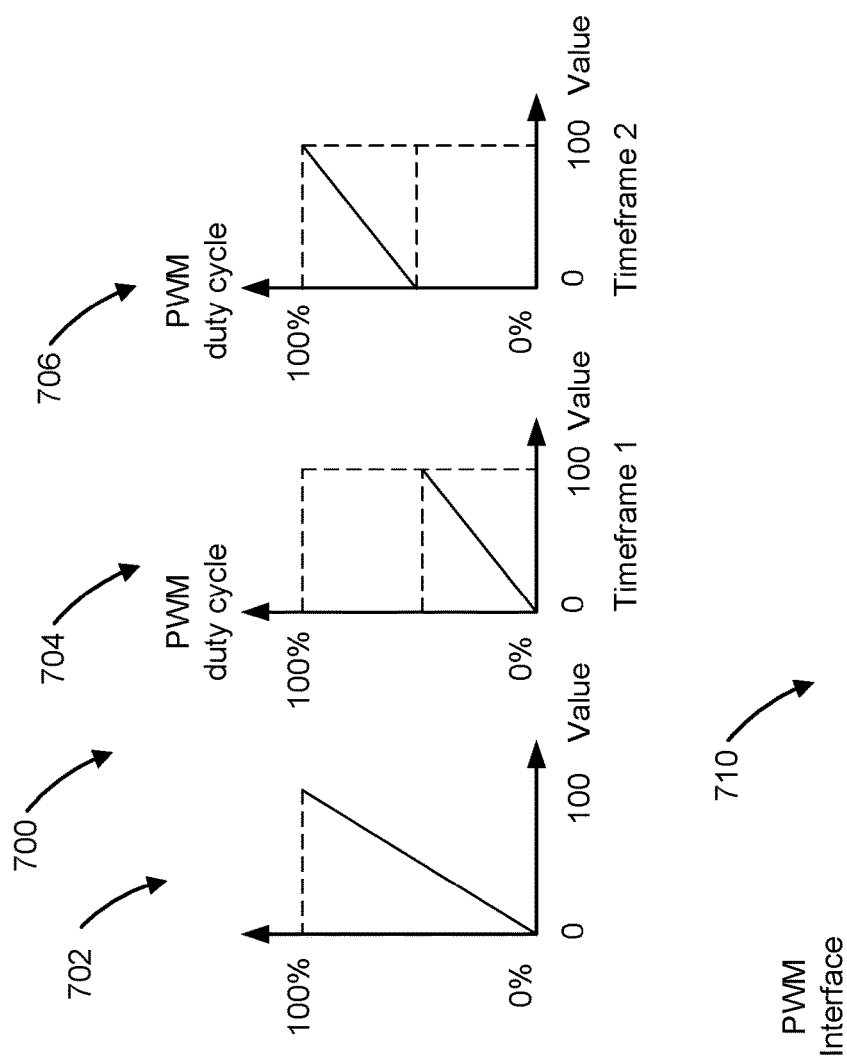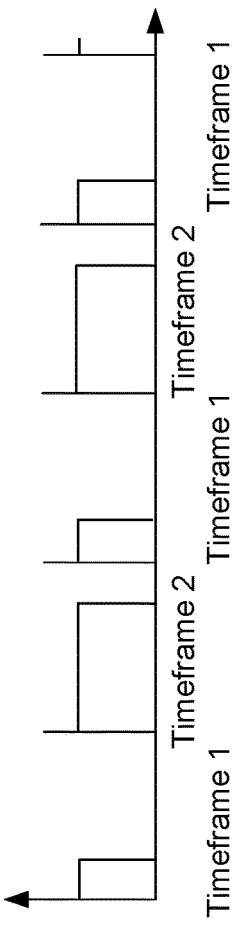

SENSOR WITH INTERFACE FOR FUNCTIONAL SAFETY

CROSS-REFERENCE

This application is a continuation of U.S. patent application Ser. No. 14/316,208, filed Jun. 26, 2014 (now U.S. Pat. No. 9,863,786), which claims the benefit of U.S. Provisional Application No. 61/847,097 filed Jul. 17, 2013, entitled "SENSOR DEVICE", the entireties of which are incorporated herein by reference.

BACKGROUND

Functional safety represents a clear differentiator for current and future products in automotive industries. To achieve corresponding targets in terms of automotive safety integrity level (ASIL) new and enhanced concepts have to be established. To achieve a dedicated ASIL level different target parameters as failures in time (FIT) rate, diagnostic coverage, SPFM, LPFM, etc., have to achieve a dedicated value.

For sensors, a typical safety goal is it to ensure dedicated signal accuracy in a predefined time (e.g., 5° deviation of the true angle value has to be detected in 5 ms at an angle sensor). The problem to be overcome in that context is simply how to prove a dedicated diagnostic coverage by specific safety mechanisms. The choice of safety mechanisms represents an important element and the more a dedicated mechanism is able to cover, the better.

An important element represents the interface between sensor and ECU, as this can only be covered partly by internal checks as well as partly by external checks. Therefore innovative concepts for the interface are needed, which cover the link between sensor and ECU in an optimal form.

DESCRIPTION OF THE DRAWINGS

FIGS. 7a-7b are waveform diagrams of signals that can be transmitted from sensors or sensor elements in accordance with various aspects disclosed.

DETAILED DESCRIPTION

Figure 1:
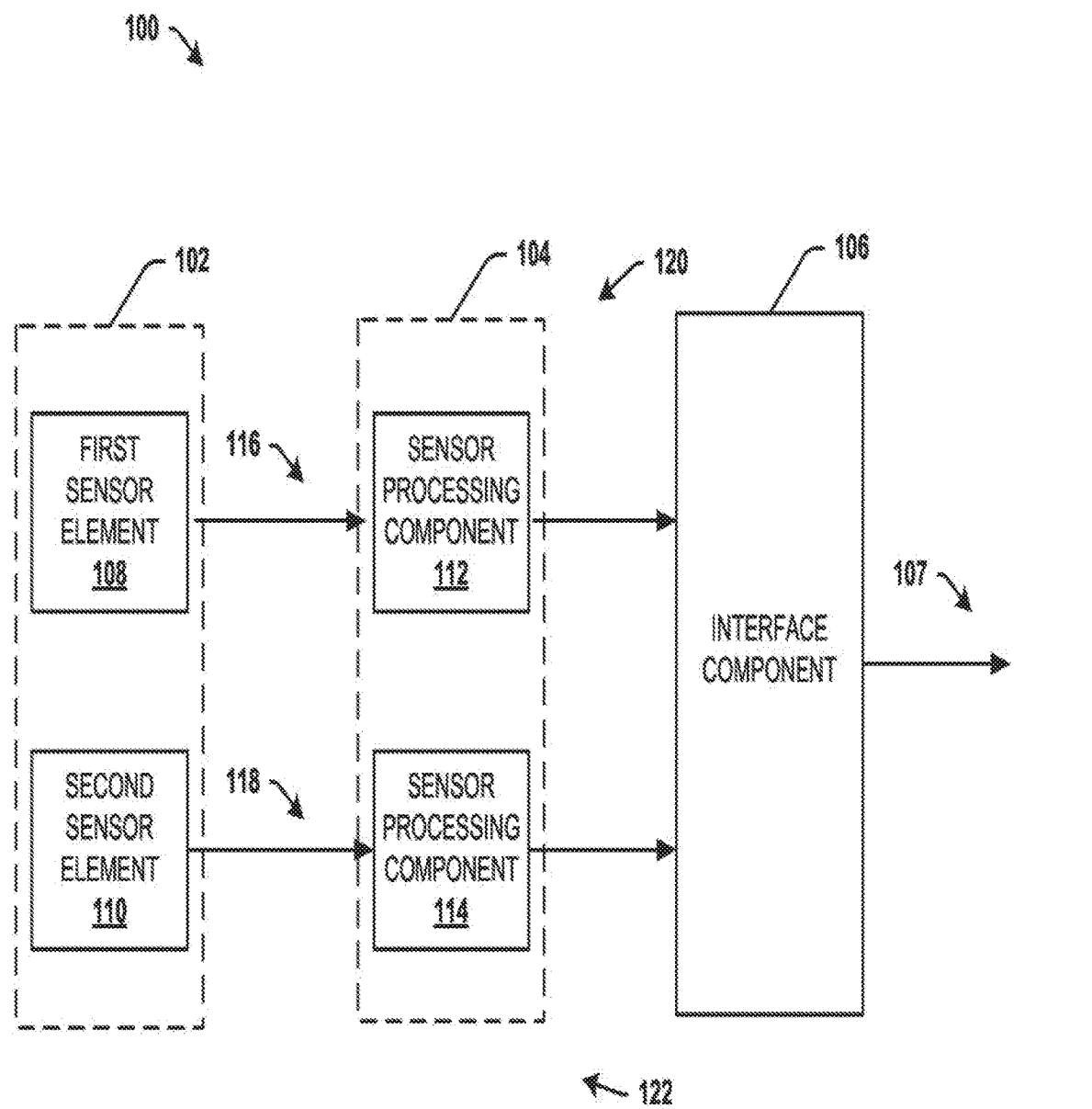
FIG. 1 is a block diagram of a sensor interface system in accordance with various aspects disclosed.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can Include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies, various aspects are directed towards sensor interface systems that transmit measurement data of a physical quantity (e.g., a sensed quantity, a measured quantity, a sensor signal, one or more signal components for a sensed signal, or the like) via an interface without compromising data rate and information integrity. For example, one or more sensors can detect data of a physical quantity with one or more sensor elements and communicate the data in different representations via an interface to a control unit, which, in turn, can control one or more sub-systems based on the data received. Each sensor element can operate to alternate signal components or data representations of the same sensed quantity to generate a single signal output of the sensed quantity. For example, communication of measured data can be performed independently via separate signal pathways with the same physical quantity in different representations, which can be swapped (alternated, switched back and forth, sequenced, etc. among the data representations) from among signal paths or within a single path to at a single output node as a sensor signal. Components of the sensor interface system can operate to ensure data integrity efficiently without compromising data rates by ensuring signal accuracy in a predefined time period. A stuck at or error can be detected by a controller (e.g., ECU) based on the different data representations of a sensed quantity from a single sensor, for example. These two data representations can be transferred to an interface and any error in the data can be determined by a receiver component (e.g., controller, ECU) according to the sequencing or separation of a range, a time domain, a multiplexing, or other representation that corresponds to the different data representations, for example. Additional aspects and details of the disclosure are further described below with reference to figures.

FIG. 1 illustrates a sensor interface system 100 that operates to transfer sensed data and information along processing paths and stages in accordance with various aspects disclosed. The system 100, for example, comprises a redundant or diverse sensing processing stage 102 coupled to a signal processing stage 104 and an Interface control component 106, which operate in conjunction to provide an output at a single node or terminal 107 that is generated from different data representations.

The interface system 100 can include a sensor that can comprise one or more sensor elements 108, 110, in which each receive or generate a signal or signal component of a sensed measured quantity or property (e.g., a quantity of heat, pressure, magnetism, direction, orientation, etc.) for generating a single output signal of the sensed quantity at the interface output. The sensor elements 108 and 110 can independently provide signals or different signal components of an output signal 107 to different sensor signal processing pathways 116 and 118 respectively within the redundant or diverse sensing processing stage 102. Although two different paths 116, 118 are illustrated, interface architectures having only one path are also envisioned. The interface system can comprise just on sensor element, in which various embodiments described operate along only one signal processing path with one signal processing component 112 by alternating data representations of the same sensed quantity to provide a single signal of the sensed quantity at the interface output. For example, the sensor elements 108 and 110 can operate to communicate signal components respectively having different data representations, such as different trigonometric representations, inverse representations with respect to one another, different addends of a sum, or other different proportional or inverse proportional representations with respect to one another.

For example, a polarity of a Hall sensor or other sensor can be swapped, alternated (back and forth or sequenced in expressions. In which the entire signal pathway 116 and/or 118 can swap or alternate between two points. The different data representations can be altered within a single signaling pathway from one or more sensor elements, or within different signaling pathways from a plurality of sensor elements, to provide a single signal output of the sensed quantity.

A "stuck at", or a failure, in one component (e.g., signal processing component 112 or 114) within the path 116, 118 or the branch 120, 122 (including the interface 106) can be detected by an ECU or other control unit receiving the output 107 comprising the different signal components because the differences in the data representations can be predetermined and known to the ECU or other control. Thus, two different data representations of a single signal of a detected or sensed quantity can be communicated by an interface in a manner that the swapping of the different data representations is visible to the receiving component (e.g., ECU or other control unit).

The different signal processing pathways 116 and 118 can comprise a first sensing branch 120 and a second sensing branch 122 of the system 100, which can be independent from one another and provide the same sensed quantity data in different representations from one another via one sensor element in a branch (e.g., a magnetic field sensing sensor) providing different signal components in different representations of the same sensed quantity, or via more than one sensor element along different branches (e.g., an angle sensor comprising one or more sensor elements for providing a first angle value and one or more sensor elements for providing a second angle value). For example, the first sensing branch 120 can be configured to provide a first sensor signal component corresponding to the sensed quantity in a first representation of data, and the second sensing branch 122 can be configured to provide a second sensor signal component corresponding to the sensed quantity in a different representation of the data. The different signals, communications or signal components from each sensor element 108, 110 can then facilitate and form a single signal at a single node or output 107 that is based on different data representations from each branch or within each branch 120, 122.

Each branch 120, 122 within the redundant or diverse sensing processing stage 102 can separately comprise a signal processing component 112 or 114 that further processes data of the sensed quantity, which can be identical in physical meaning, such as a same measurable or sensed quantity or value. The data from the branches 120, 122 can differ with respect to one another in the representation that the data is communicated and be components of the same signal at the output 107. For example, the different data representations can be different trigonometric representations (e.g., cosine, sine) of the same measured quantity, inversely proportional representations, proportional representations of the sensed quantity, sum components equaling one or another quantity, or other representations of the sensed data or quantity that differ with respect to one another among the branches 120 and 122. The different data representations can be generated at different points along the interface system, such as before the signal processing components 112 or 114, after the components 112 or 114, or within the interface component 106, for example. For example, the difference in representations can be the result of a separation of 0 to $2^{11-1}$ for one representation or $2^{11}$ to $2^{12-1}$ for another representations, in which the data representations can be different within each single branch or pathway or swapped in representations from among the paths. Although different representations of data are swapped in polarity within one path or among different signaling paths, the information (e.g., sensed data, safety information, error code, or other like information) can still be discerned by the interface system for identifying faulty data, maintain efficient processing rates, and error-free processing for a control unit, which can further operate within a more complex system to facilitate accurate and function safety of one or more sub-systems and is further detailed below.

The redundant or diverse sensing processing stage 102 is coupled to the signal processing stage 104. The signal processing stage 104 comprises at least a portion of the first processing pathway 116 and the second signal processing pathway 118, a first sensor processing component 112 and a second sensor processing component 114. The first processing pathway 116 communicates an output of the first sensor element 108 to a first sensor processing component 112, and the second processing pathway 118 communicates an output of the second sensor element 110 to the second processing component 114. The first and second processing pathways 116, 118 can each comprise differential pathways, in which at least two pathways are configured within each path for communicating data information and safety information along with correctional coding, such as one or more error correction coding, for example. The two differential signal paths of each pathway can be swapped from among one another in data representations so that the representations alter in a polarity, with respect to one another, or alternated between the pathways 116, 118, for example. Alternatively, the processing pathways 116, 118 can each comprise a single link for communicating information such as the same detected physical quantity (e.g., magnetic field, pressure, light, etc. in a unit of measure, signal value, direction, amplitude or the like) in different representations as signals components for facilitating a single output signal 107 of a single sensed quantity. The first signal processing component 112 can be configured to operate upon a first output of the first sensing branch 120 and the second signal processing pathway 118 configured to operate upon a second output of the second sensing branch 122, in which each signal processing component can include one or more of normalizing components, temperature calibration components, filters, calculating components (e.g., angle calculations or the like), analog-to-digital components (ADC), or control units comprising a processor or other device components for processing and performing operations related to each.

The system 100 includes an interface component 106 configured to provide a modulated signal output that is a function of the first sensor signal component or data representation and the second sensor signal component or data representation to a node or a pathway 107 that provides the data to another control unit, processing device or other component, such as an ECU for further utilization. The Interface component 106 is not limited to any one interface type and can operate as a digital interface component configured for modulation and transfer of a digital bit stream, for example, or as a different interface such as a pulse width modulation interface component 106 for modulation or transfer of a pulse width modulated signal, in which further examples below detail more in depth.

Figure 2:
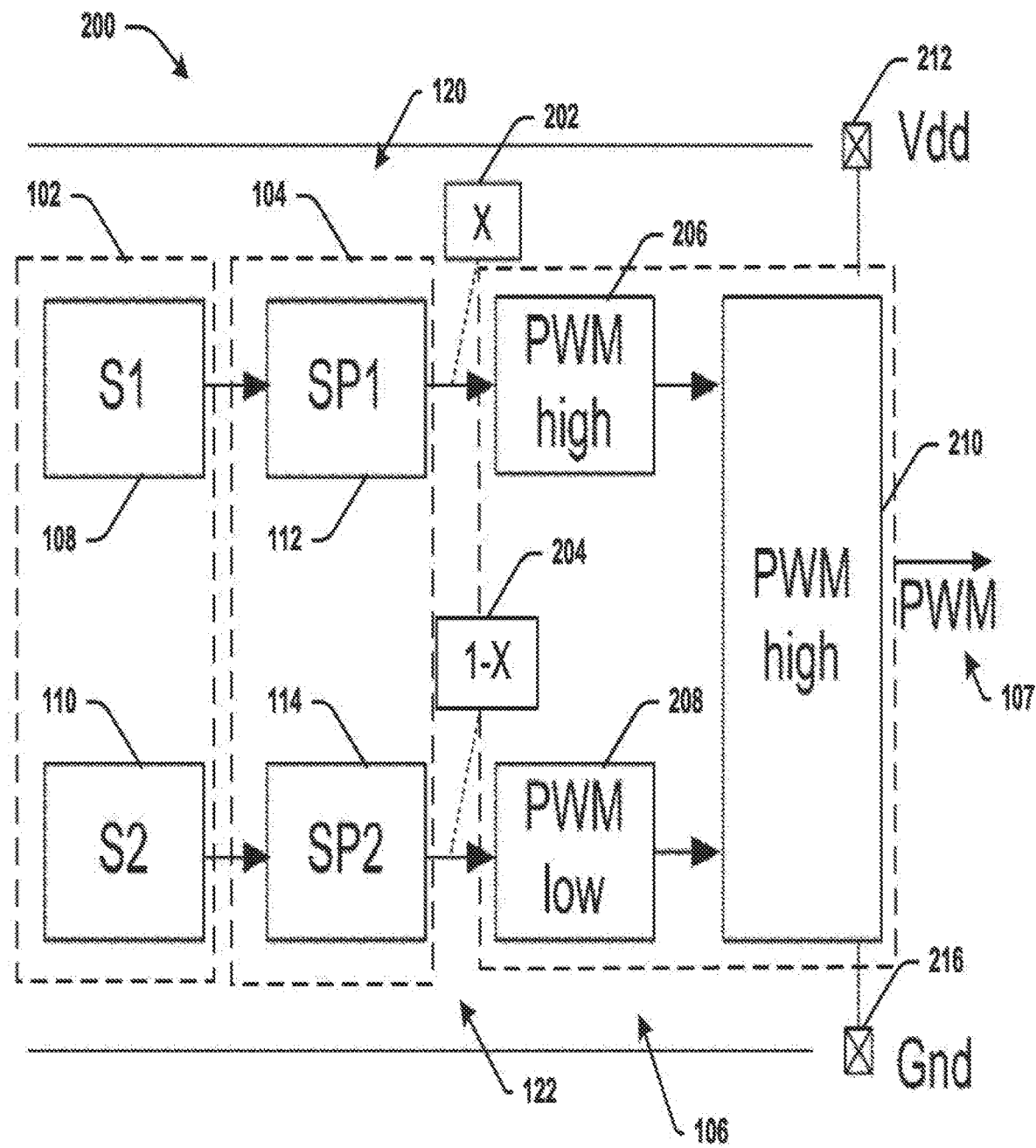
FIG. 2 is another block diagram of a sensor interface system in accordance with various aspects disclosed.

Referring to FIG. 2, illustrated is another example sensor interface system 200 that operates to transfer sensed data and information along different processing paths in different data representations for generating a sensor output signal in accordance with various aspects disclosed. The system 200 includes similar aspects discussed above, and further details the interface component 106, which comprises at least two drivers and at least two transistors for generating high and low periods of a pulse width modulation (PWM) generation.

The interface component 106, as discussed above, operates as a single interface control unit for independent signal processing paths that communicate a same measured sensed quantity simultaneously, at about the same time, or concurrently and in different representations. The interface component 106 receives independent signals along the independent processing pathways from the first signal processing component 112 and the second signal processing component 114. The interface component 106 is not limited to any one type of interface control and can comprise a digital interface, PWM interface or other type Interface for communicating, modulating, or processing different signals from the two independent signal branches 120, 122. One example of the interface component 106 includes a PWM interface control component 106 that comprises a PWM high component 206, a PWM low component 208, a pull up transistor 210, and a pull down transistor 212.

The interfaces component 106 can operate by splitting the PWM operation Into independent hardware parts for the high and low period of the PWM generation within the interface component 106. The separation of the path branches 120 and 122 of the system 200, for example, can be nearly entire or almost complete, except for a single link or node 214 between both branches, which can be also realized in a way that it can lead to detectable failures in case of single point faults or a "stuck at" (stuck at high, stuck at low, high ohmic output, wrong period, or the like), if one or more components fail.

As discussed above, the two sensors elements (S1 and S2) 108 and 110 can operate to deliver independent measurements of the same physical property. For example, the different representations can have at least one of opposite signs, different trigonometric representations, inverse relations, component portions of a sum, other proportional represents, or the like of the sensed quantity or property, and can be communicated in different data representations such as via a separation in a duty cycle range, a time domain range, another range, or according to different time multiplexing so that the different data representations enable a detection of an error. For example, the sensor elements can be components of a Hall sensor with opposite bias current directions, or sensor bridges (e.g., magnetoresistive (xMR) sensors or piezoresistors) with inverse setup, or the like. Furthermore, the sensing elements 108 and 110 can be differently oriented with respect to the measured magnetic field or can be located in different spatial locations with known differences of the magnetic field that is generated by the underlying magnetic circuit. The signal processing SP1 and SP2 components 112 and 114 can operate to calculate a calibrated output signal of each sensor measurement both covering a normalized signal range 0 . . . 1. The signal processing can be performed in a way that one output representation 202 of the branch 120 can be proportional to the measured signal (x) and the other output 204 is following an inverse function (1−x), in which other different data representations are also envisioned as discussed herein with respect to the different branches 120 and 122, for example. In the present figure, the sum of both complementary signals could be predetermined to be one (within the accuracy limits or a given tolerance of the measurements), or some other sum, which enables a receiving component or the ECU to determine whether there is a stuck at or error in the signally path of each branch.

One of the signal branches, for example, branch 120 can be assigned a first control 206 that receives the output of the signal processing component 104 and can be configured to operate an independent counter. The first control 206 can operate to drive a high state of an output signal 107 such as a PWM signal or other output digital signal. The first control 206 can drive the output driver 210 with Vdd 212, for example, for a high state, as illustrated. Further, the other signal branch, for example, branch 122 can be assigned a second control 208 that receives the output of the signal processing component 114 and can be configured to utilize another counter, which is independent from the branch 120 and corresponding components therein. The output driver 210 can operate to utilize the independent counter as a driver for driving a low state of the output signal 107. The second control 208 can drive the output driver 210 to ground 216, for example, or to some other low state. Although a PWM high and low is illustrated, the signals can also be a simplified digital signal that is modulated from a high state 212 and a low state 216 such as a ground within the output driver 210 to generate the output at a path or node 107, such as a PWM output for example.

Figure 3:
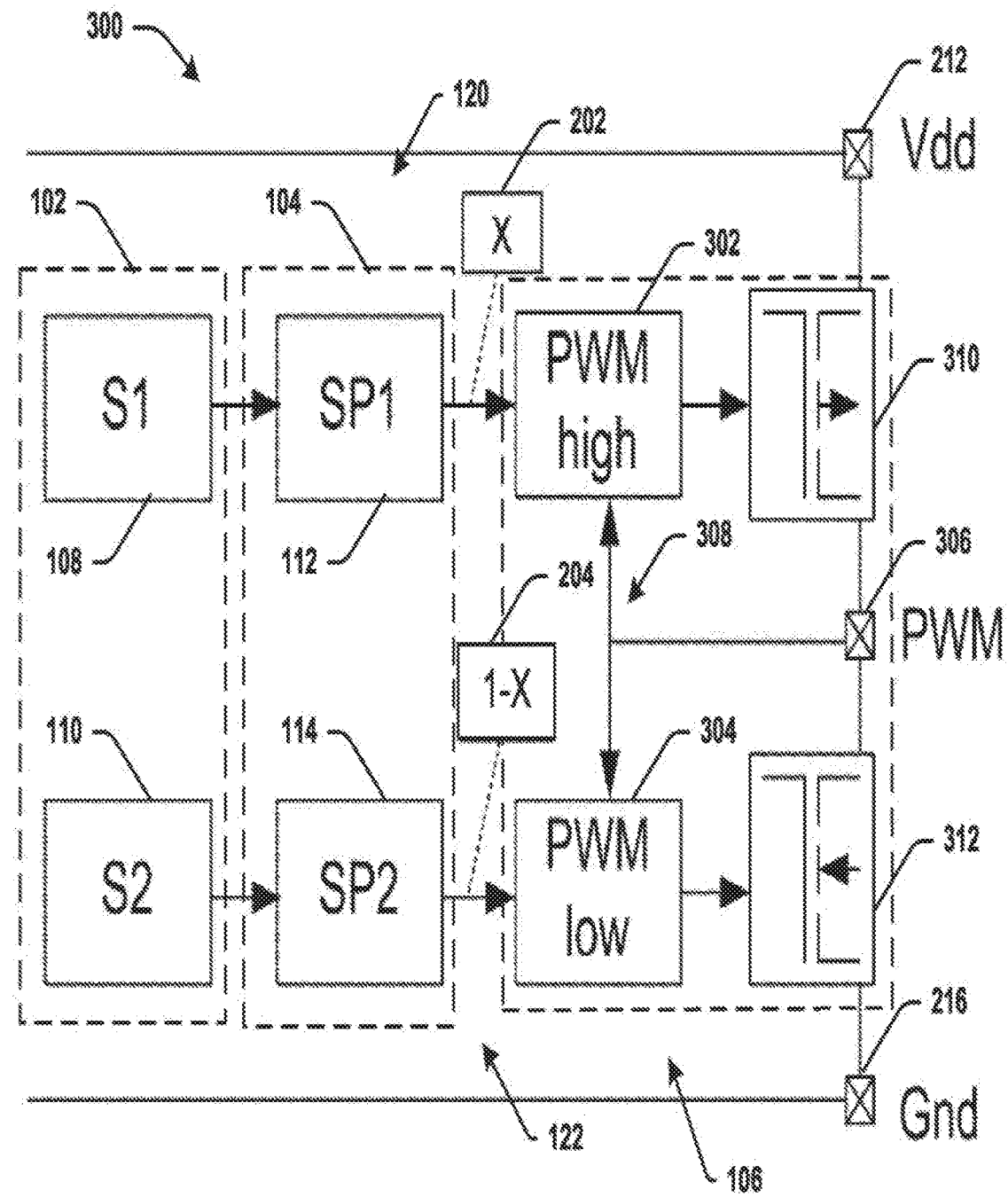
FIG. 3 is another block diagram of a sensor interface system in accordance with various aspects disclosed.

Referring to FIG. 3, illustrated is another aspect of the interface systems disclosed. The system 300 includes a single node 306 that supplies an output to one or more other control units, such as an ECU (not shown). The interface component 106 further includes a pull up transistor 310 and a pull down transistor 312 that are operated by a PWM driver circuit 302 and a PWM driver circuit 304 respectively. The PWM driver 302 and PWM driver 304 are communicatively coupled to on another via a communication link 308, which can be for determining an operational status, for example, among the drivers 302 and 304.

One of the signal branches, for example branch 120, can be assigned to a high state output PWM driver 302 of the interface component 106, which controls a pull up transistor 310, and the other branch 122, for example, can be assigned to the low phase or low state PWM output driver 304, which controls a pull down transistor 312. The low state PWM driver 304 can operate to test whether the high side transistor 310 is activated, operational or actively conducting by injecting a test current and measuring as voltage drop, which can be between Vdd 212 and ground 216, for example. The driver 304 further operates to look the low side transistor 312 or the transistor gate control as long as the high side transistor 310 is conducting. Likewise, the high side driver 302 can operate to monitor the low side transistor 312 conductivity in the same manner and lock the high side gate driver or the controller 302 if the low side transistor 312 or the transistor switch is on, operational or activated.

The resulting output can thus be a PWM output at the node 306 that is formed by two independent measurements, which each contribute to the duration of the high and low phase of the PWM independently. This can enable a simple checking of whether the two measurements correspond to one another or fit together, since the sum of both determine the PWM carrier frequency, which should be independent of the signal. For example, if a failure occurs in the calculation of the signal processing branch 120 or the signal processing branch 122, the sum of the values would not be equal to one anymore, which also means the period time of the signal will be changed and enables a detection of errors in the signal processing. Thus, a direct recognition can be made from the received signal that there is a failure in the processing of the sensor. Other mechanisms for ensuring data accuracy and sensor interface control are further detailed below. Furthermore, a failure of the driver stages, or the high side transistor 310 or low side transistor 312, will also lead to an improper operation of the PWM output, which can be detected with a high probability if at least one of the following monitoring operates is performed by the receiver of the PWM signal: a) monitoring of the logic high and low levels; and b) monitoring of the rise and fall time of the signal.

Figure 4:
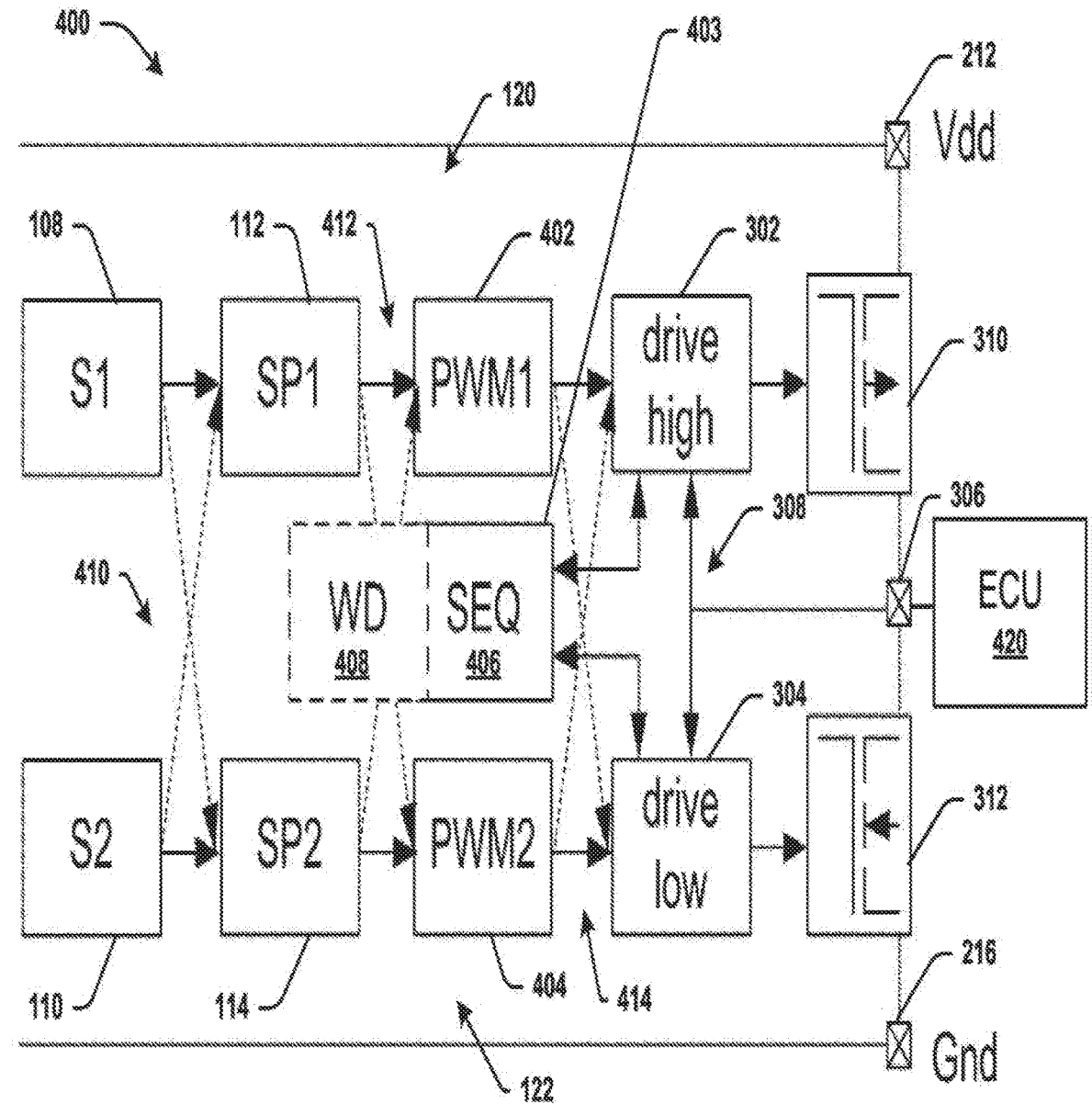
FIG. 4 is another block diagram of a sensor interface system in accordance with various aspects disclosed.

Referring to FIG. 4, illustrated is a sensor Interface system 400 for interfacing sensor data with a control unit in accordance with various aspects disclosed. The system 400 includes similar components as discussed above, and further includes PWM controllers 402 and 404 that operate drivers or driver circuits 302 and 304 for pull up transistor 310 and pull down transistor 312. The system 400 can further include a switching component 403 with a sequence component 406 that alternates the signals or the signal paths along each branch 120 and 122 and within each branch, from among differential paths of each branch, or from among the signal path branches 120, 122.

The switching component 403, for example, is configured to swap signal paths or signal components from the sensor elements along the branches 120 and 122. The switching component 406 can operate to swap signals paths at various points or locations along the branches 120 and 122. For example, at location 410 the swapping can occur just after the outputs of the sensing elements 108 and 110. The signal outputs of each sensing elements can be swapped periodically so that each branch processes both the signal of a first data representation X and 1−X, which can represent a number of different data representations, as discussed above, other than ones that equal a sum of one, such as different trigonometric representations (e.g., cosine, sine), inverse relations to one another with respect to the different branches, or the other such data representations of the same sensed quantity between the sensed elements 108 and 110.

In another example, the signals paths or signals of the branches 120 and 122 can be swapped in any number of sequences by the switching component 406 and at other locations 412 or location 412 of the branch paths. The location 412, for example, can include a location after any component within the signal components 112 and 114, in which each can comprise a normalization component (not shown) for normalizing the signal along a range such as zero and one, a temperature calibration component (not shown) for calibrating for temperature variables, analog-to-digital components (ADC), or control units comprising a processor or other device components for processing and performing operations related to each.

Alternatively or additionally, the switching component 403 can swap signal paths of signal components of one branch with the other within the interface 106, such as after the PWM controller PWM 1 402 and PWM 2 404, for example. The PWM controller 402 and PWM controller 404 can operate to perform pulse width modulation and generate pulse width modulated signals at teach output. The PWM controllers 402 and 404 can also operate to test the drivers 302 and 304 based on monitoring signals. The PWM controller 402 can operate to inject a test current and measure a voltage drop of the low side transistor 312, and then lock the high side driver 302 if the low side transistor is conducting. Further, the PWM 2 controller 404 can operate to also determine whether the high side transistor 310 is conducting and lock the low side driver or gate 304 during operation of the pull up transistor 310 based on the determination. The high state driver or component 302 can be configured to receive the first output from the first signal processing path and control the pull up transistor 310 and the low state driver or component 304 configured to receive the second output from the second signal processing path and control the pull down transistor 312. The duration of an operational status of the pull up transistor 310 or of the pull down transistor 312 can be based on a range of separation along a signal range of the first sensor signal and the second sensor signal, or a time of separation in a time domain of the first sensor signal or signal component and the second sensor signal or signal component.

The switching component 403 is configured to swap the first sensor signal component received for processing at the first sensing branch 120 with the second sensor signal component received for processing at the second sensing branch 122 at any one of locations 410, 412, or 414, for example. Alternatively or additionally, the switching component 403 can operate to switch polarities of the signal components of the switching elements 108 and 110. The switching component 403 can further include a sequence controller component 406 that is configured to control the switching component 403 based on the monitoring signals that determine an operational status of a pull up transistor and a pull down transistor. As discussed above, the monitoring of the signals or signal components can be controlled by the PWM controllers 402 and 404. Alternatively the driver circuits 302 and 304 could be configured to generate test or monitoring signals that are also communicated to the switching component 406.

In one aspect, the sequence component 406 can initiate switching of the signal paths from one branch to the other, or among each branch, so that each switching path processes signals or the signal components from each sensor element or sensor bridge (e.g., a bridge circuit or the like) of the one or more different representations (e.g., X, 1−X, cosine, sine, or the like). The sequences can be done in different manners or polarities. For example, a polarity switching among or within the branches can be performed by the switching component 403 in an asymmetrical sequence like ++−++−++− in this case the two identical periods can be identified by the ECU that receives the PWM modulated signal (not shown) as the one with regular polarity and the single different period as the inverse one.

Further, the switching component 403, such as via the sequence component 406, can be configured to alter the carrier frequency for the different polarities like long+short−long+short−. In this case the duration of the sum of high and low phase can mark the polarity or differences between the data representations. Additionally or alternatively, a marker can be inserted at a known point in the polarity switching sequence like m+−m+−m+− (e.g. a short high low sequence which does not fall into the regular range of the PWM operation).

In one aspect, recognition of the different data representations X or 1−X can be performed by an ECU 420 that receives the PWM signal according to different mechanisms, such as via different duty cycles or range of separations within duty cycles. For example, identifying which signal received could be X or 1−X, or in the case of an angle sensor interface, cosine or sine, an inverse relationships or the other differing representations enables distinguishing between the signals of branch 120 and branch 122. In one aspect the duty cycles of the signals could be altered to recognize the different data representations from the signal path branches. For example, one duty cycle can be a multiple of another and correspond to the branch 122 for signal 1−X, and the other duty cycle can be identified as a factor of the first, or opposite data representation, X and as corresponding to signal branch 120, for example. This can operate in situations, for example, where sampling frequencies are high and X is not changing much, or the period is not changing drastically. In another aspect, a separation of the signal range within a duty cycle and a time frame or signal period can also enable identification of the different signal representations. Further, the differences in representation can be distinguished by a separating in the time domain where switching between the two representations or signal paths can be performed continuous and utilize an entire PWM range, in which a synchronization components operates to synchronize the time periods for the signals. Even though the signal itself is the same, the different representations can enable the detection of errors at the interface. An ECU is then able to also recognize how to interpret the different representations to a real or functional value. The ECU or other control unit can be configured to detect an error of the sensor stage, the signal processing stage or the interface based on a detection of the first data representation or the second data representation not corresponding to the difference or separation in a range (e.g., a duty cycle range, time range, frequency range or the other range of difference), a time domain difference or separation, or a different in time multiplexing, for example.

In another aspect, an internally monitoring can occur for each duty cycle such as with a watchdog component or a synchronizing component 408. The synchronizing component 408 can be configured to determine timeframes associated with the first signal component and the second signal component, in which the first data representation and the second data representation different with respect to one another based on different time multiplexing or other differences in representations discussed herein. The synchronizing component 408 can operate a watchdog function by internally comparing the PWM period with an independent oscillator coupled thereat. The synchronizing component 408 can be configured to generate a comparison of a signal period with an independent oscillator and synchronize or reset a period of the first sensor element 108 that generates a first sensor signal, or of the second sensor element 110 that generates the second sensor signal, based on the comparison.

Figure 5:
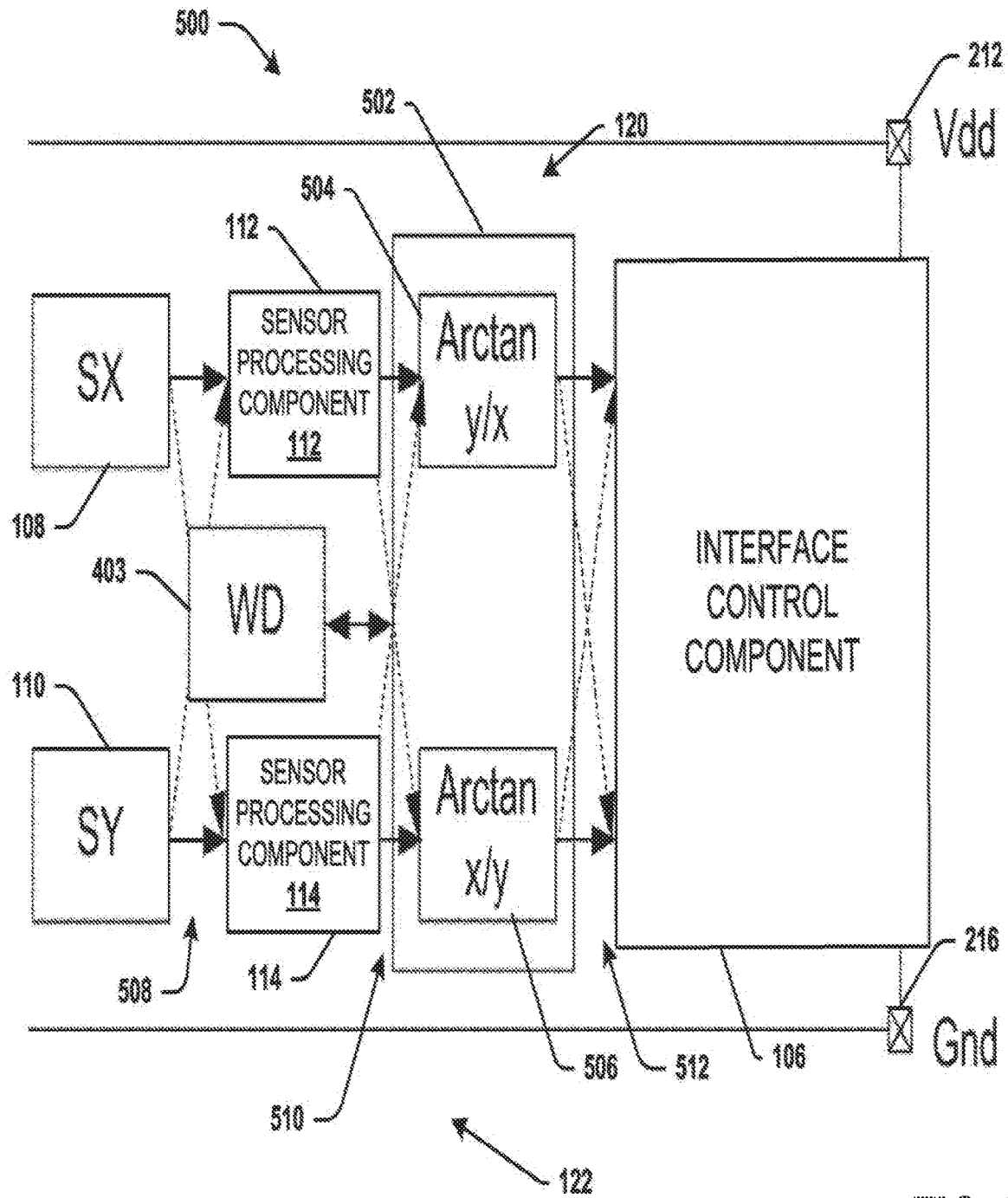
FIG. 5 is a block diagram of a sensor interface system in accordance with various aspects disclosed.

Referring now to FIG. 5, illustrated is another example of a sensor interface system in accordance with various aspects described. The sensor elements 108, 110, for example, can comprise magnetic sensor elements or bridge circuit components of a sensor (e.g., an angle sensor, vertical Hall sensors, anisotropic magnetoresistance (AMR) sensor giant magnetoresistance (GMR), tunnel magnetoresistance (TMR), or the like) that operate to detect a physical quantity of a magnetic field. For example, the sensor element 108 can comprise a co-sinusoidal component 108 and a sinusoidal component 110, which can reside on a single die or processing chip area to integrate the sensing elements on an integrated circuit.

The sensing elements 108 and 110 can operate to generate differential outputs for X and Y components of a rotating magnetic field. The outputs can be differential analog outputs, for example, that are further provided to the signal processing components 112 and 114 respectively in independent processing paths and can comprise different signals from the same sensor, different sensor signals from different sensors, or different signal components (different polarities) in different data representations of the same measured quantity (e.g., a same magnetic field quantity) to generate a single signal of a single sensed quantity from different representations. The sensing elements 108 and 110, for example, can comprise four or more AMR elements that sense an X-component, a Vx component (cosine), and the Y-component, and Vy (sine) of a magnetic field, such that a direction and a magnitude can be communicated with a cosine function and a sine function respectively. The processing branch 120, for example, can comprise a cosine quantity and the processing branch 122 can comprise sine quantity of the same sensed quantity, in which each branch can comprise a differential signal branch for providing sensor data and safety information corresponding to each of the X values (X component and cosine) and the Y values (y component and sine) as different signals components for a single sensor signal of a sensed value or quantity, for example.

The signal processing components 112 and 114, as discussed above can comprise various signal processing components along an independent signal processing path or pipeline that is independent from one another within respective processing branches 120 and 122, such that no connections are fixed among the paths and processing along each component is independent from components of the other processing branch. In one aspect, the only permanent physical connection, for example, can be seen at the node 306 for providing an output signal from the interface system 500 that is a function of the different data representations. Each signal processing component 112, 114 can include one or more of normalizing components for normalizing a range (e.g., zero to one), temperature calibration components, filters, calculating components (e.g., Cordic, angle calculations or the like), analog-to-digital components (ADC), or control units comprising a processor or other device components for processing and performing operations related to each.

Each of the branches 120 and 122 further comprise an angle component 502 that can determine an angle derived from outputs of the signal processing components 112 and 114. The angle component 502 comprises an arctan component 504 and an arctan component 506 that respectively operate to determine an angle as a function of the respective signals received. Although arctan component 504 is illustrated as arctan y/x and arctan component 506 is illustrated as arctan x/y, each component can function as either or both for determining angle calculations. Each of the arctan components 504, 506 can be independent from one another and the outputs can be processed as a sum that equals one or a different value for recognizing as either branch 120 or 122, or as originating from sensor element 108 or 110, for example. Alternatively, other means of recognizing the signal origins can also be utilized, as discussed above and further detailed below.

The switching component 403 can be configured to switch the sine and cosine signals along a signal processing branch, or switch between a measured value and a reference value of the sensors. The switching component 403 can also include the sequencing and synchronizing components for switching signal paths between the first processing branch 120 and the second processing branch 122 according to one or more sequences. The sequence of switching can be a function of a watchdog or oscillator (e.g., synchronizing component 408) component that determines a reset of a period and monitors period tolerances, for example. The switching component 403 can swap the signals from the different processing branches from the first branch 120 to the second branch 122, or vice versa, at different locations, such as before the sensor processing components 112 or 114, along a point within multiple components of the sensor processing components 112 and 114 therein, before the angle component 502, or after the angle component 502 and before the interface control component 106 for PWM output generation at a node or output path.

Figure 6:
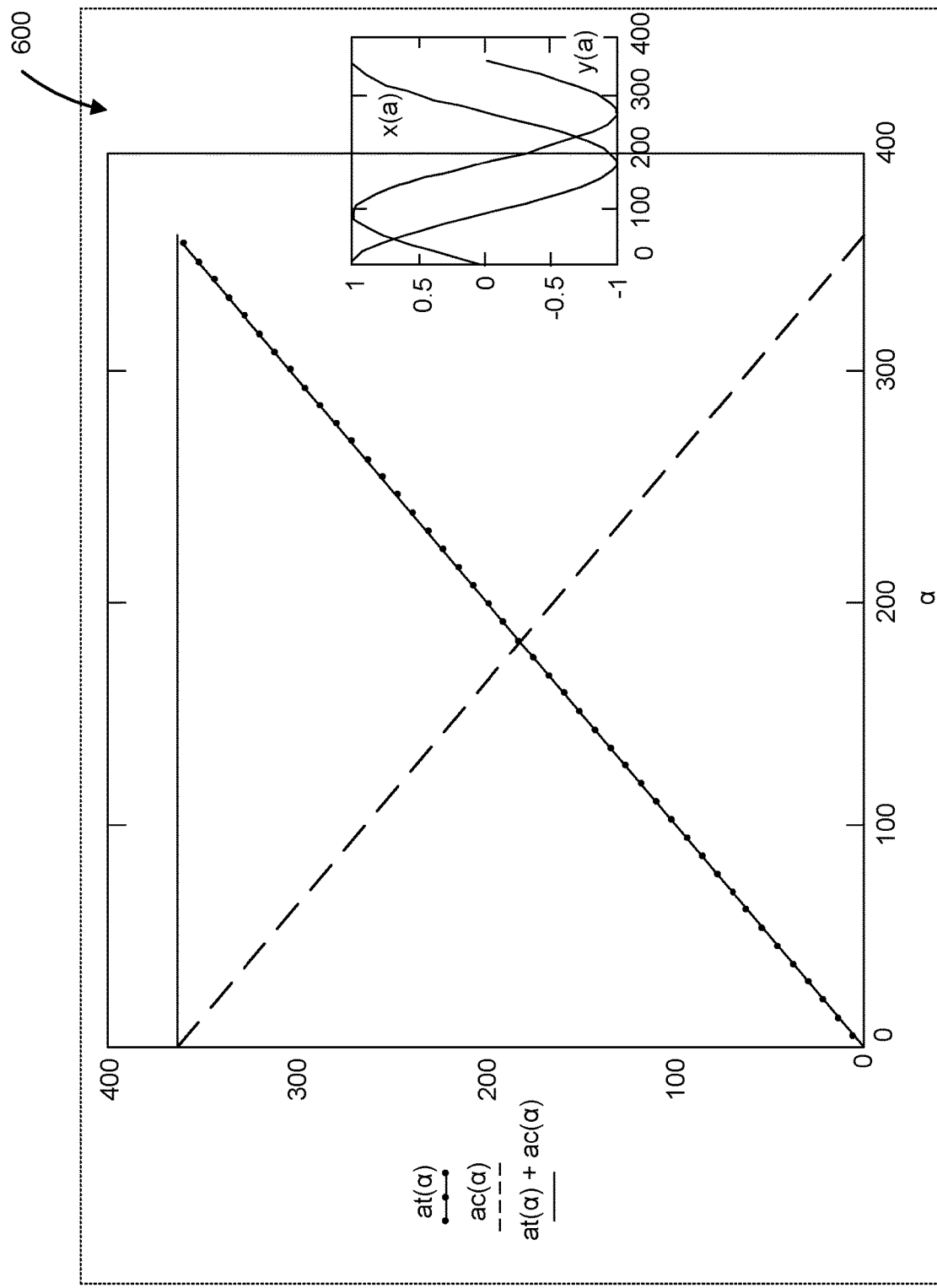
FIG. 6 is a waveform diagram of signals that can be transmitted from sensors or sensor elements in accordance with various aspects disclosed.

Referring to FIG. 6, illustrated is a graph representation of the different signals. For example, the plot 600 represents an example of signals at a point in the processing branch 120 and in the processing branch 122. The x-axis represents angles in degrees, and the y-axis represents the arctangent of each signal path as computed by the angle component 502. The dotted line represents the signal computation corresponding to the processing branch 120 and the dashed line represents the signal computation corresponding to the processing branch 122. The solid line represents the sum of the two calculations, or of both sensor elements, in which the output of X and 1−X is processed together as a sum and can be used to determine whether an error has occurred.

In one aspect, the different signals can be different representations, such as inverse representations, or other different representations, which can be proportional, linear or other representation of the same sensed physical quantity. By switching the signals via the switching component 403 the entire signal path is followed in a correct way, such that if the predefined values are not achieved, an error can be identified, such as the detection of a stuck at. The predefined switching between values can fully comprise the sensed information, such as the case when switching between a sine signal component or a cosine signal component of an angle sensor, which can be a sine or cosine quantity of the same measured quantity from the sensor elements or sensor bridge components.

In another aspect, the interface protocol can be defined differently so that the interface system, such as via the Interface component 212 is operable to indicate an origin of the difference from among the different representations. For example, indicating the origin of difference between the signals of the different signal processing branches 120 and 122 can be performed via a separation of the signal range. A PWM signal can be separated within a range of a duty cycle, for example, such that a first half of a range of the duty cycle provides a representation of one signal along from a first sensor element and another or second half of a range of the duty cycle can correspond to the second data representation. Alternatively or additionally, an origin of the difference can be recognized via a separation of a frequency domain or of a time domain, in which the switching component 403 can switch continuously among the two different data representations utilizing an entire or whole PWM range. In the latter case, a synchronization component of the switching component 403 can be utilized for ensuring the proper time frame is recognized.

Referring to FIG. 7a, illustrated is a set of signal representations for a sensed quantity that are plotted for a timeframe with a value (e.g., quantity, measure, magnitude, or like value) that is represented along the x-axis and a duty cycle percentage along the y-axis. A sensed quantity that is detect by each sensor element 108, 110 can be represented by the plot 702. The same value/signal value is transferred in a different representation and a range is split into two areas or portions of a range of separation for a duty cycle over a time frame. Therefore, the plot 704 illustrates one data representation of a sensed quantity and the plot 706 illustrates another data representation of the same sensed quantity, in which each plot 704 and 706 provides a different range of the signal along the duty cycle to distinguish the same sensed quantity provides by different signaling paths or branches along the interface from different sensor elements. This enables the interface to distinguish between a crossed mode (e.g., in a case where signal components of a different data representation of a different sensor element is swapped) or a normal mode (e.g., in a case where a signal component generated from a sensor element of the corresponding branch) in order to determine which sensor element or signal branch of the interface the signal being received originates from. For example, the value 50 could be delivered with 25% of the duty cycle range at one timeframe and 75% at the other timeframe so that the value, or sensed quantity, is the same. Each data representation is unique or different from among the two sensor elements 108, 110, and is able to be identified at the ECU or other control unit.

For example, an angle sensor could have the sensor elements 108 and 110 discussed above that have provided sensed data in different representations with respect to each other so that sensor element 108 always communicates a sine value and the sensor element 110 always communicates a cosine value for determining a resulting angle, for example. As the signal components from each sensor element are switched (e.g., a polarity is changed within the sensor elements 108, 110), a resulting angle can be different and is transferred by at least one of the different representation discussed herein.

Referring to FIG. 7b, illustrated is a pulse train of the signals along at least one branch of a sensor interface system in accord with various aspects disclosed. The pulse train 710 demonstrates two different data representations of signals that can be received along at least one signal branch of the interfaces systems discussed, in which switching of the branch signals is conducted via a switching component 403, for example. The data is represented according to a separation in a time domain, in which the PWM signal of one data representation is separated in time compared to another data representation and corresponding values differ according to the separation. For example, a value of 50 could be represented at 25% duty cycle of the time in time frame one and 75% duty cycle at time frame 2. In response to the interface component or another component of the interface system receiving the different data, representations corresponding to the different timeframes, the interface component can operate to calculate back to the original value based on the predetermined separation in the time domain. Other different representations are also envisioned and the representations are not limited to any one particular example discussed herein.

Figure 8A:
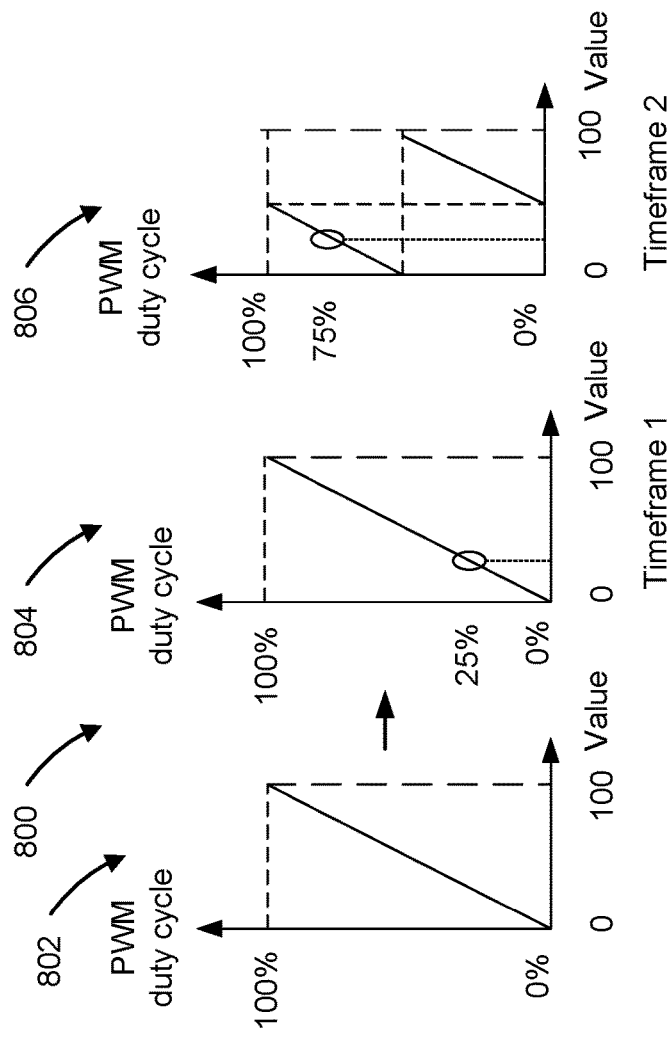
FIGS. 8a-8b are waveform diagrams of signals that can be transmitted from sensors or sensor elements in accordance with various aspects disclosed.

Referring to FIG. 8a, illustrated is a set of signal plots 800 that illustrate different representations of signals provide by different sensor elements detecting the same sensed quantity. In another aspect, a same value or sensed quantity shown in the plot 802 can be transferred via different representations within the same range as shown by plots 804 and 806, but are time multiplexed such that signals appear differently on the duty cycle in different fractions of the time period or time frame in a sequence (e.g., an alternating sequence), for example. In one example, a value of 25 represented by the circle along the plot of the sensed quantity can represent 25% duty cycle at one time frame (e.g., Timeframe 1) in the plot 804, and 75% duty cycle at a second time frame (e.g., Timeframe 2). The representation is not unique as such and thus the timeframes can be distinguished from one another as a function of the synchronization or synchronizing component 408 for example.

Figure 8B:
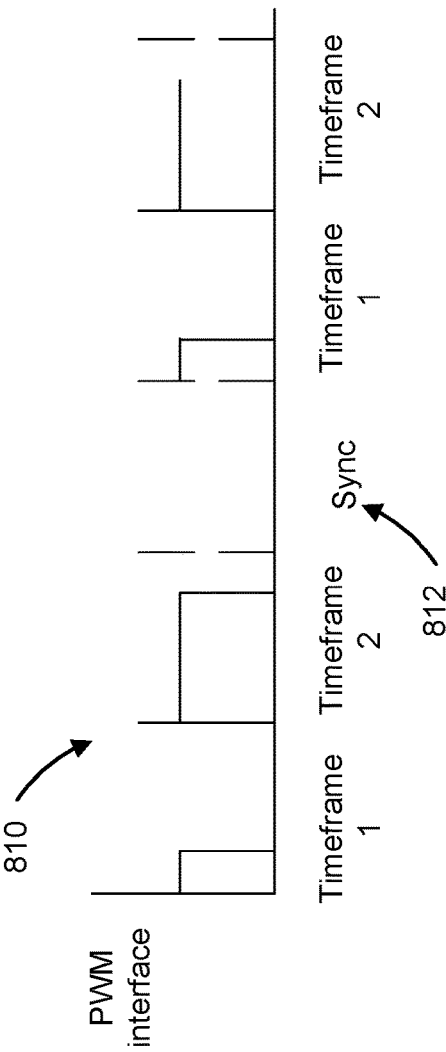

FIG. 8b illustrates a pulse train 810 that demonstrates the synchronization 812 via the synchronizing component 408, for example. The signal range can also be restricted to comprise 5% to 95%, or some other different range, such that the signal outside of the range can be used for synchronization for determining which period or time frame (e.g., Timeframe 1 or Timeframe 2) is being received and determining the origin of the signal. After synchronizing 812, the interface receiving component can operate to identify the data. Switching between two representations is based on crossing or inverting sine or cosine in the sensor bridges defining the sensor elements on a same die area of a processing chip, for example.

Figure 9:
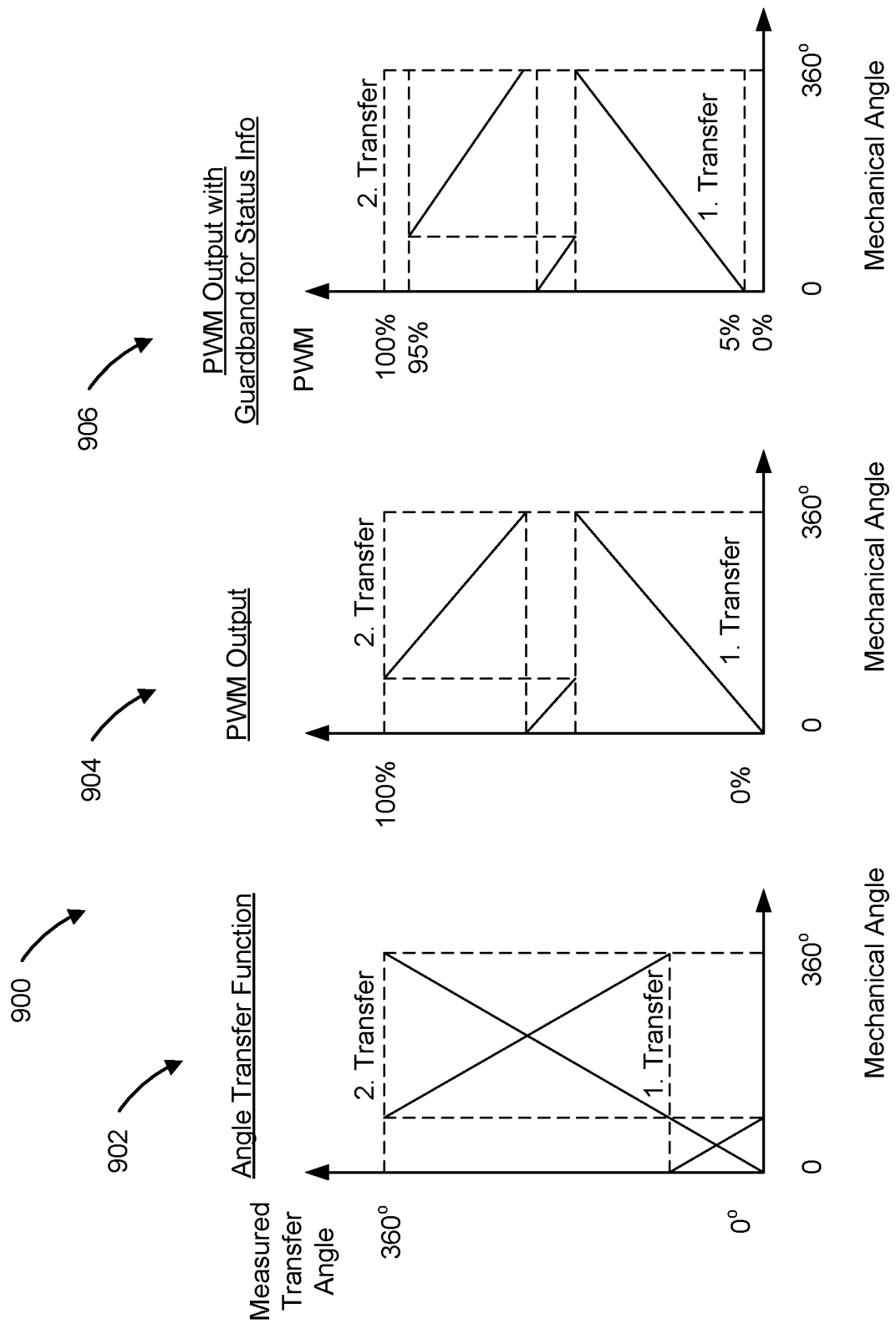
FIG. 9 is a set of waveform diagrams of signals that can be transmitted from sensors or sensor elements in accordance with various aspects disclosed.

Referring now to FIG. 9, illustrated is a set of plots 900 illustrating transfer functions and PWM data being sent of the calculated angle. To ensure that none of the signal path branches have a stuck at or a failure occurring in the processing operations of each branch of the interface system, the signal paths can be crossed or inverted in the plots. This leads to a different transfer function of the calculated angle as indicated by the angle transfer function plot 902 of the measured angle versus the mechanical angle. The plot 904 represents the transfer function of the sent PWM data of the duty cycle versus the mechanical angle or reference angle among the two different data representations combined, and the plot 906 represents the sent PWM data, combined with a guard band or narrowing region of the duty cycle for further transferring status information and/or synchronizing. The additional guard band region can enable the signals to communicate error coding and further data for determining error in the signal transmission by communicating in a duty cycle range or other range that is less than an entire range.

Figure 10:
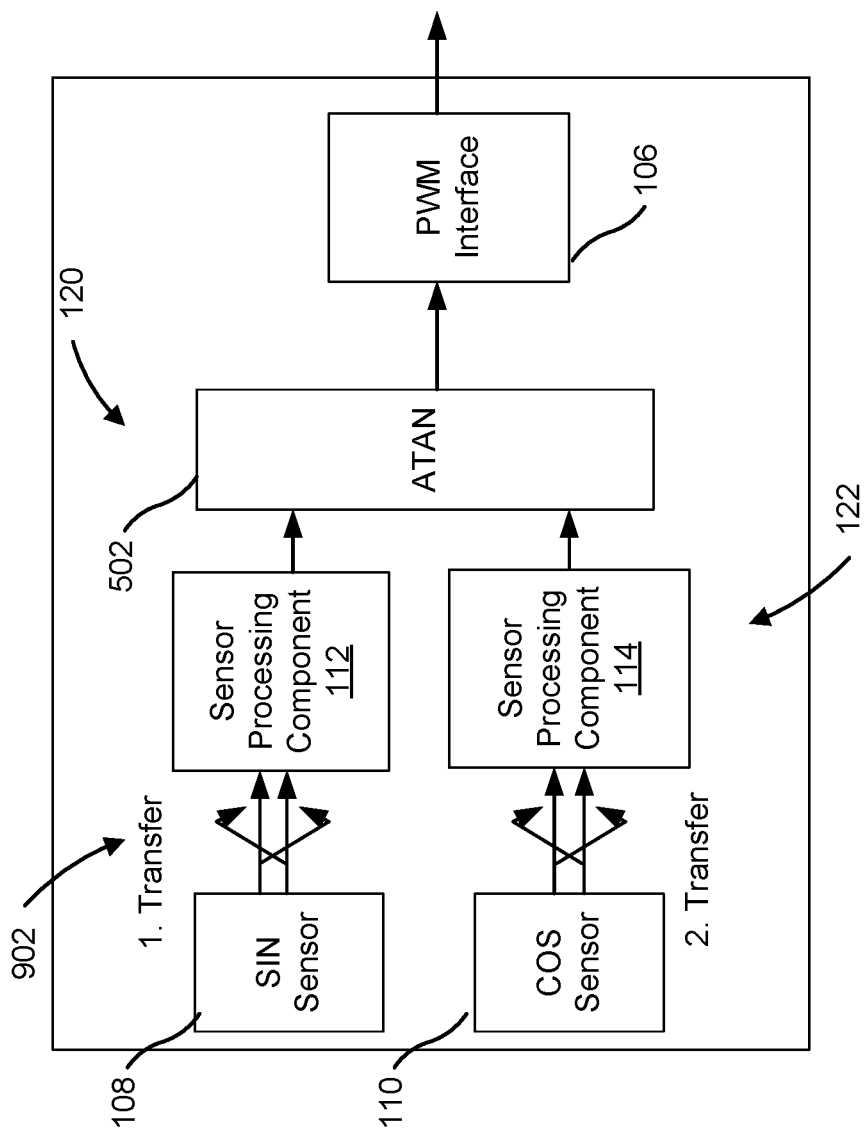
FIG. 10 is a block diagram of a sensor interface system in accordance with various aspects disclosed.

Referring to FIG. 10, illustrated is a sensor interface system comprising the signal processing branches according to aspects disclosed. The sensor interface system 1000 includes differential signal paths along each processing branch 120, 122. The switching component (not shown) can operate to invert the values of each path with respect to the other within each processing branch 120 or 122, for example. In an aspect, the signals of branch 120 can be inverted with respect to the signal of the branch 122. In another aspect, the signals of each signal processing path or branch 120 of a corresponding sensor element 108, for example, can be switched or swapped in sequences within the path branch 120. Likewise, the signal processing branch 122 can be switched between the differential paths of the branch 122. In one example, the signals of each branch can be inverted, either within differential processing paths of each branch 120 with different polarities, 122 or from among the different branches 120, 122, as discussed above.

Figure 11:
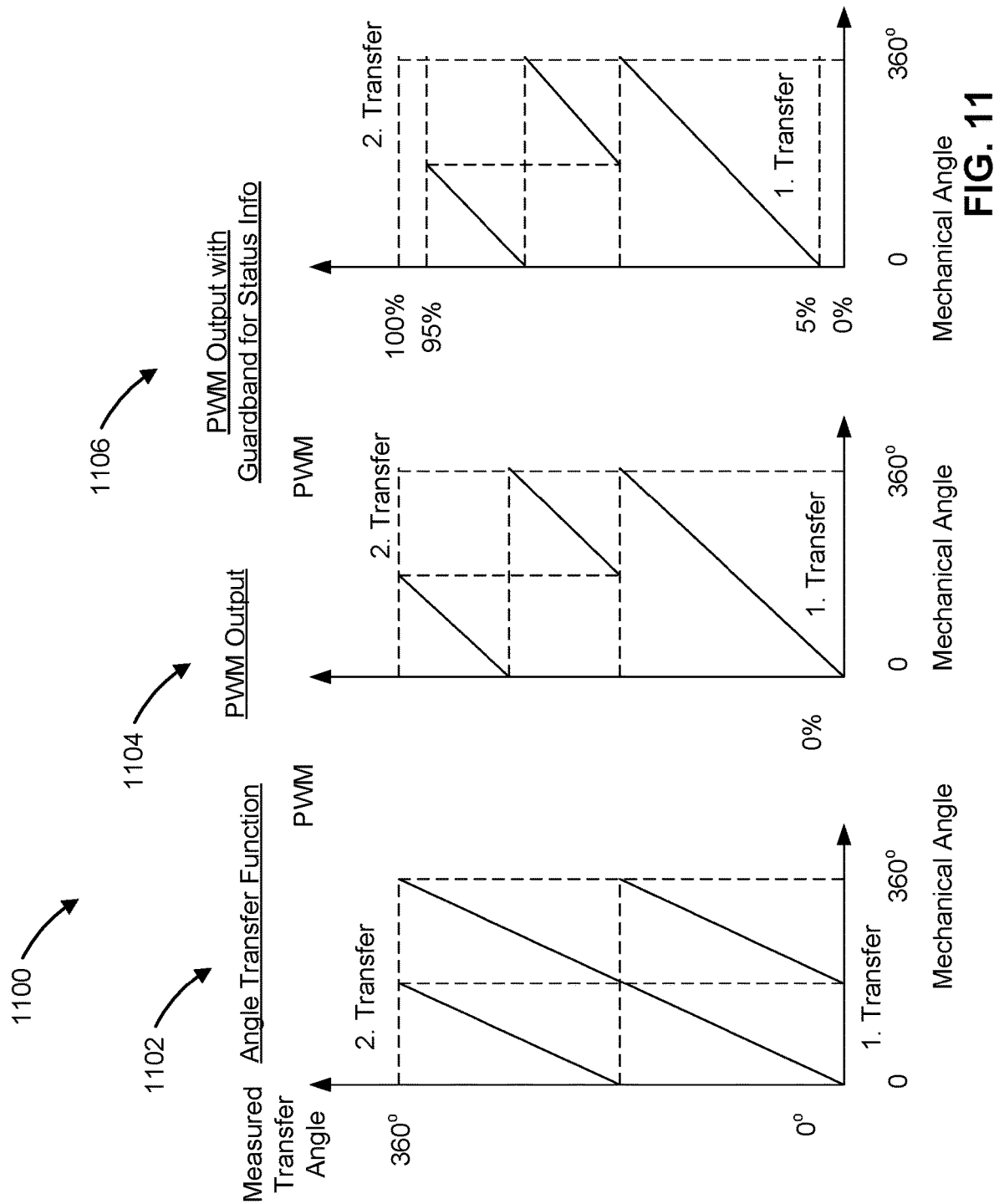
FIG. 11 is a set of waveform diagrams of signals that can be transmitted from sensors or sensor elements in accordance with various aspects disclosed.

Referring to FIG. 11, is illustrated is a set of plots 1100 illustrating transfer functions and PWM data being communicated of the calculated angles with inverted sine and cosine signals. To ensure that none of the signal path branches have a stuck at or a failure occurring in the processing operations of one or more components of each branch in the interface system, the signal paths can be crossed or inverted in the plots. This leads to a different transfer function of the calculated angle as indicated by the angle transfer function plot 1102 of the measured angle versus the mechanical angle. The plot 1104 represents the transfer function of the PWM data of the duty cycle versus the mechanical or reference angle among the two different data representations combined. The plot 1106 represents the sent PWM data combined with a guard band or narrowing region of the duty cycle for further transferring status information and/or synchronizing. The two different representations are still unique and enable the control unit (e.g., ECU) or other receiving component to calculate the mechanical angle.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 12:
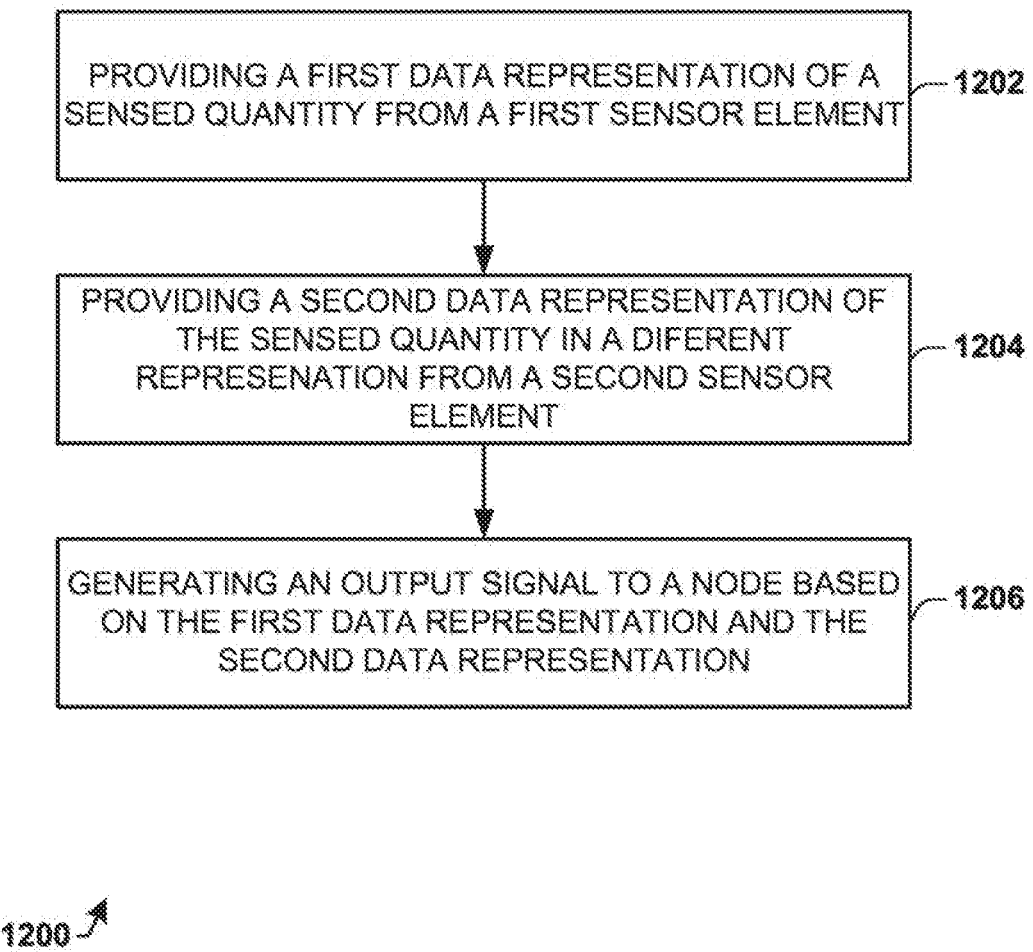
FIG. 12 is a process flow of a sensor interface system in accordance with various aspects disclosed.

Referring to FIG. 12, illustrated is a method 1200 for sensor interface systems in accordance with aspects disclosed. The method 1200 initiates at 1202 and comprises providing a first signal component or first data representation of a sensed quantity from a first sensing element (e.g., 108) to a first signal processing path (e.g., signal processing branch 120).

At 1204, the method comprises providing a second signal component or second data representation of the same sensed quantity from a second sensing element in a different representation within the first signal processing path or to a second signal processing path (e.g., branch 122), which can be concurrent to, simultaneously or at about the same as act 1202.

At 1206, an output signal (e.g., a PWM or digital interface output signal) is generated at a node as a function of or based on a first signal and a second signal, or the first signal component or data representation and the second signal component or data representation.

The method 1200 can further comprise switching or alternating the first signal component or data representation of the sensed quantity to the second signal component or data representation based on a switching sequence. The different signal components or data representations can be from different paths or within each path, in which the first signal processing path or branch and the second signal processing path or branch can be different in representation as a sine signal or a cosine signal, for example, or as an inverted signal with respect to one another. The signals can be represented differently, for example, by a separation in a range, such as a range of a duty cycle so that the origin (the first sensor element or the second sensor element) of each signal is able to be distinguished via different ranges in the signal. For example, each signal from among the two sensor elements can comprise a different percentage of a duty cycle. Alternatively or additionally, the separation can occur in a frequency domain or in a time domain. The signals can also be time multiplexed and the time periods identified by a synchronizing component having an oscillator, for example.

The method 1200 can further comprise providing a test signal to a pull up transistor of an interface component that is coupled to the first signal processing path, and providing a test signal to a pull down transistor coupled to the second signal processing path to determine an operational status of the pull up transistor and the pull down transistor. In response to determining the operational status, the first signal of the sensed quantity can be switched or swapped with the second signal processing path and the second signal of the sensed quantity switched with the first signal processing path.

Although the disclosure has been shown and described with respect to one or more implementations, equivalent alterations and modifications will occur to others skilled in the art based upon a reading and understanding of this specification and the annexed drawings. Further, it will be appreciated that identifiers such as "first" and "second" do not imply any type of ordering or placement with respect to other elements; but rather "first and" "second" and other similar identifiers are just generic identifiers. In addition, it will be appreciated that the term "coupled" includes direct and indirect coupling. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A sensor system comprising:
  a first sensor element configured to provide a first signal component in a first data representation of a sensed quantity;
  a second sensor element configured to provide a second signal component in a second data representation of the sensed quantity;
  a signal processing branch configured to operate upon the first signal component and the second signal component;
  an interface configured to provide a sensor signal, generated based on the first signal component and the second signal component, to a controller,
    the interface comprising:
      a high state component configured to receive a first output from a first signal processing path of the first sensor element and control a pull up transistor; and
      a low state component configured to receive a second output from a second signal processing path coupled to the second sensor element and control a pull down transistor; and
    the controller configured to detect, based on receiving the sensor signal, a signal processing error.

2. The sensor system of claim 1, where the controller is configured to detect the signal processing error based on a function of the first signal component and the second signal component.

3. The sensor system of claim 1, where the first signal component and the second signal component have a proportional relationship to one another and differ according to different representations of the sensed quantity that comprise different trigonometric representations or different inverse representations of the sensed quantity.

4. The sensor system of claim 1, further comprising:
  a switching component configured to alternate the first signal component received for processing at a first sensing branch with the second signal component received for processing at a second sensing branch.

5. The sensor system of claim 1, further comprising:
  a switching component configured to alternate a polarity of the first signal component at a first sensing branch.

6. The sensor system of claim 1, further comprising:
a synchronizing component configured to determine timeframes associated with the first signal component and the second signal component,
the first data representation and the second data representation differing with respect to one another based on different time multiplexing.

7. The sensor system of claim 6, wherein the synchronizing component is further configured to:
generate a comparison of a modulated signal period with an independent oscillator and synchronize the first sensor element and the second sensor element based on the comparison.

8. The sensor system of claim 1,
where a duration of an operational status of the pull up transistor and of the pull down transistor is based on:
a range of separation along a signal range of the first signal component and the second signal component, or
a time of separation in a time domain of the first signal component and the second signal component.

9. The sensor system of claim 1, further comprising:
a low side controller configured to lock the low state component based on a determination of whether the high state component is actively operating the pull up transistor; and
a high side controller configured to lock the high state component based on a determination of whether the low state component is actively operating the pull down transistor.

10. The sensor system of claim 1, further comprising:
a switching component configured to alternate the first signal component in the first data representation of the sensed quantity from the first sensor element with the second signal component in the second data representation of a same sensed quantity within the signal processing branch and another signal processing branch,
the first data representation and the second data representation differing based on a separation of a range of a duty cycle.

11. A sensor interface comprising:
a first sensor element configured to communicate a measured quantity in a first data representation;
a second sensor element configured to communicate the measured quantity in a second data representation;
a switching component configured to swap between communicating the first data representation of the measured quantity and the second data representation of the measured quantity;
an interface component configured to generate an output signal to an engine controller based on the first data representation and the second data representation,
the interface component comprising:
a high state component configured to receive a first output from a first signal processing path of the first sensor element and control a pull up transistor; and
a low state component configured to receive a second output from a second signal processing path coupled to the second sensor element and control a pull down transistor; and
the engine controller configured to detect, based on receiving the output signal, a signal processing error.

12. The sensor interface of claim 11, where the engine controller is configured to detect the signal processing error based on a function of the first data representation and the second data representation.

13. The sensor interface of claim 11, where at least one of:
the first data representation comprises a first addend of a sum and the second data representation comprises a second addend of the sum,
the first data representation comprises a cosine representation and the second data representation comprises a sine representation, or
the first data representation is an inverse representation of the second data representation.

14. The sensor interface of claim 11, further comprising:
a synchronizing component configured to generate a comparison of a modulated signal period of the output signal with an independent oscillator,
the first data representation and the second data representation differing based on a time of separation in a time domain.

15. The sensor interface of claim 11, where:
the first sensor element comprises a first sensor bridge configured to generate the first data representation of the measured quantity, and
the second sensor element comprises a second sensor bridge configured to generate the second data representation,
the first data representation and the second data representation having a proportional relationship to one another and differing according to different representations of the measured quantity that comprise different trigonometric representations or different inverse representations of the measured quantity.

16. The sensor interface of claim 11, where the switching component is further configured to:
swap a first signal component in the first data representation and a second signal component in the second data representation at least one of:
before the first signal processing path and the second signal processing path, after the first signal processing path and the second signal processing path, or within the interface component.

17. The sensor interface of claim 11, wherein the switching component is further configured to:
swap different polarities of the first sensor element and the second sensor element to communicate the first data representation and the second data representation of the measured quantity based on at least one of:
an asymmetrical sequence for identification of at least two time periods corresponding to the polarities,
different durations, or
a marker inserted into a point in a swapping sequence for swapping the different polarities.

18. A method, comprising:
providing, by a system at least partially implemented in hardware, a first data representation of a sensed quantity from a first sensing element;
providing, by the system, a second data representation of the sensed quantity from a second sensing element that is a different representation than the first data representation;
generating, by the system, an output signal based on the first data representation and the second data representation;
monitoring, by the system, logic high levels and logic low levels of the output signal; and detecting, by the system, a signal processing error based on monitoring the logic high levels and the logic low levels of the output signal.

19. The method of claim 18, further comprising:
switching the first data representation of the sensed quantity to the second data representation of the sensed quantity based on a switching sequence that is a function of at least one of:
different duty cycle ranges,
different times in a time domain, or
a same range but different time multiplexing operations.

20. The method of claim 19, where the different duty cycle ranges or the same range comprises less than an entire range to facilitate communication of status information within a guard band portion of the entire range.

* * * * *